US010809564B1

(12) United States Patent
Bidari (10) Patent No.: US 10,809,564 B1
(45) Date of Patent: Oct. 20, 2020

(54) SYSTEMS AND METHODS FOR IMPROVING TRANSPARENCY OF DISPLAY DEVICES TO WIRELESS SIGNALS

(71) Applicant: Square, Inc., San Francisco, CA (US)

(72) Inventor: Emad Bidari, Toronto (CA)

(73) Assignee: Square, Inc., San Francisco, CA (US)

( * ) Notice: Subject to any disclaimer, the term of this patent is extended or adjusted under 35 U.S.C. 154(b) by 139 days.

(21) Appl. No.: 16/202,556

(22) Filed: Nov. 28, 2018

(51) Int. Cl.
*G02F 1/1335* (2006.01)
*G06Q 20/32* (2012.01)
*H04B 5/00* (2006.01)
*H01Q 1/02* (2006.01)
*H01Q 1/22* (2006.01)
*H01Q 7/00* (2006.01)

(52) U.S. Cl.
CPC ... *G02F 1/133553* (2013.01); *G06Q 20/3278* (2013.01); *H01Q 1/02* (2013.01); *H01Q 1/2216* (2013.01); *H01Q 7/00* (2013.01); *H04B 5/0075* (2013.01); *G02F 2202/16* (2013.01)

(58) Field of Classification Search
CPC .......... G02F 1/133553; G06Q 20/3278; H01Q 1/02; H01Q 1/2216; H01Q 7/00; H04B 5/0075
See application file for complete search history.

(56) References Cited

U.S. PATENT DOCUMENTS

| 4,723,836 | A * | 2/1988 | Kono | G06F 3/0412 345/104 |
| 9,178,572 | B1 * | 11/2015 | Zhang | H01Q 1/44 |
| 2005/0168096 | A1 * | 8/2005 | Joho | H02K 3/14 310/213 |
| 2014/0203981 | A1 * | 7/2014 | Nakano | H01Q 9/0407 343/749 |
| 2014/0291404 | A1 * | 10/2014 | Matsuoka | H02J 50/10 235/462.46 |
| 2017/0338864 | A1 * | 11/2017 | Rolsted | A61M 5/31568 |
| 2018/0048055 | A1 * | 2/2018 | O'Driscoll | H01Q 1/38 |
| 2019/0378368 | A1 * | 12/2019 | MacKay | G06K 19/0704 |

* cited by examiner

*Primary Examiner* — David Bilodeau
(74) *Attorney, Agent, or Firm* — Maynard Cooper & Gale, P. C.; Jon E. Holland, Esq.

(57) ABSTRACT

A wireless communication device has a display device and a transmitter that wirelessly transmits a wireless (e.g., NFC) signal from an antenna. The antenna is positioned such that the display device may be between the antenna and another wireless communication device that is to receive the signal, and the display device may attenuate such signal. A reflector of the display device is patterned with small gaps in order to limit the loop sizes of eddy currents that are induced by the wireless signal, thereby reducing parasitic power consumption of the reflector to the wireless signal. Thus, the presence of the gaps in the reflector improves the transparency of the display device to the wireless signal without significantly affecting the performance of the reflector in sinking heat and reflecting light.

16 Claims, 8 Drawing Sheets

FIG. 4
(Side View)

FIG. 5
(Top View)

FIG. 6
(Side View)

FIG. 7
(Top View)

SYSTEMS AND METHODS FOR IMPROVING TRANSPARENCY OF DISPLAY DEVICES TO WIRELESS SIGNALS

BACKGROUND

Near field communication (NFC) devices are increasingly used in a variety of applications to communicate data. In NFC communication, a first NFC device is positioned sufficiently close (e.g., a few inches or less) to another NFC device, such as an NFC reader, so that the devices are inductively coupled. Load modulation is often used to communicate data from the NFC device to the reader. In this regard, the reader transmits a wireless carrier signal, and the NFC device changes the impedance of its antenna circuit in order to modulate the carrier signal with data. The reader detects and demodulates the modulated signal in order to recover the data transmitted by the NFC device.

NFC is sometimes used in payment transactions where a mobile payment device, such as a credit card or cellular telephone, interacts with an NFC reader, referred to as a "payment reader" in this context, in order to communicate payment information. Some payment readers incorporate a display device, such as a liquid crystal display (LCD) or other type of display device, that may be used to display information and in some cases receive inputs from a user.

In many cases, the payment reader is a mobile device for which it is desirable to minimize or reduce the overall size or footprint in an effort to facilitate transportation and use. In such mobile payment readers, the display device is often relatively bulky, consuming a significant amount of surface area on the reader. Depending on the design of the payment reader, it can sometimes be difficult or problematic to locate an antenna within or on the reader such that the display device does not significantly attenuate the wireless signal transmitted by the reader for NFC communication. To compensate for attenuation resulting from the display device or other components of the reader, it is possible to increase the reader's transmit power, but any such increase in transmit power undesirably increases the reader's power requirements, thereby reducing the useful life of its batteries.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

The present disclosure generally pertains to systems and methods for improving transparency of display devices to wireless signals. In accordance with one embodiment of the present disclosure, a wireless communication device has a display device, such as a liquid crystal display (LCD), and a transmitter that wirelessly transmits a wireless signal from an antenna. The antenna is positioned such that the display device may be between the antenna and another wireless communication device that is to receive the signal, and the display device may attenuate such signal. As will be described in more detail below, the display device may be designed to reduce the amount of attenuation that it introduces to the signal, thereby improving the transparency of the display device to the signal.

Many types of display devices, including many LCDs, incorporate a reflector that reflects backlight from one or more light sources, such as light emitting diodes (LEDs). Such reflector significantly enhances the optical efficiency of the display device in producing light. The reflector is often composed of a metallic material, such as aluminum, that is electrically and thermally conductive. In this regard, many metallic materials are relatively inexpensive and strong, thereby enhancing the mechanical integrity of the display device at a reduced cost. In addition, metals generally have good thermal conductivity allowing the reflector to better dissipate heat within the display device.

However, through experimentation, it has been observed that the reflector is a significant source of attenuation for a wireless signal that passes through the display device. Specifically, the metallic material of the reflector acts an electrically conductive shield that blocks and consumes a relatively significant amount of electromagnetic energy wirelessly emitted by the antenna. In this regard, the electromagnetic energy from the wireless signal induces eddy currents in the conductive reflector, and these eddy currents are consumed by the display device, thereby attenuating the signal received by the NFC device. Reducing the amount of attenuation introduced by the reflector may have a pronounced effect on the transparency of the display device to the wireless signal and thus significantly reduce the transmit power required to transmit the wireless signal.

One way to address the attenuation problem introduced by the reflector is to remove the reflector from the display device. However, removing the reflector undesirably reduces the mechanical integrity, optical efficiency, and heat sinking capacity of the display device. In another approach, the reflector may be made of a material, such as a plastic, that is not electrically conductive, thereby reducing the effect of the reflector on the NFC signal passing through it. However, such a material may not be as strong as the metallic materials often used for the reflector and also likely will not be a good thermal conductor, thereby reducing the ability of the reflector to sink heat. In addition, in at least some cases, the non-conductive material may be more expensive than the metallic material typically used for reflectors.

In some embodiments of the present disclosure, the reflector of the display device is composed of an electrically and thermally conductive material, such as aluminum or other metal, and the reflector is cut or otherwise formed to have small gaps that are arranged in a pattern to reduce the maximum loop size of the eddy currents induced by the wireless signal passing through it. By reducing the eddy current loop size, the total amount of eddy currents generated in the reflector by the wireless signal is reduced, thereby reducing the total parasitic power consumption of the reflector and thus improving the transparency of the display device to the wireless signal. In addition, the size of the gaps can be small so that the effect of the gaps on the mechanical integrity, optical efficiency, and heat sinking capacity of the display device is also small. Thus, the presence of the gaps helps to significantly reduce the parasitic power consumption of the reflector without significantly impairing the mechanical integrity of the display device or the device's ability to produce light and sink heat.

For illustrative purposes, various embodiments of a wireless communication system will be described in the context of payment systems that process payment transactions using near field communication (NFC). However, it should be emphasized that the concepts described herein may be applied to other types of wireless communication systems, including radio frequency identification (RFID) readers and other types of NFC and short-range devices (e.g., Bluetooth) used in asset tracking and other applications.

Figure 1:
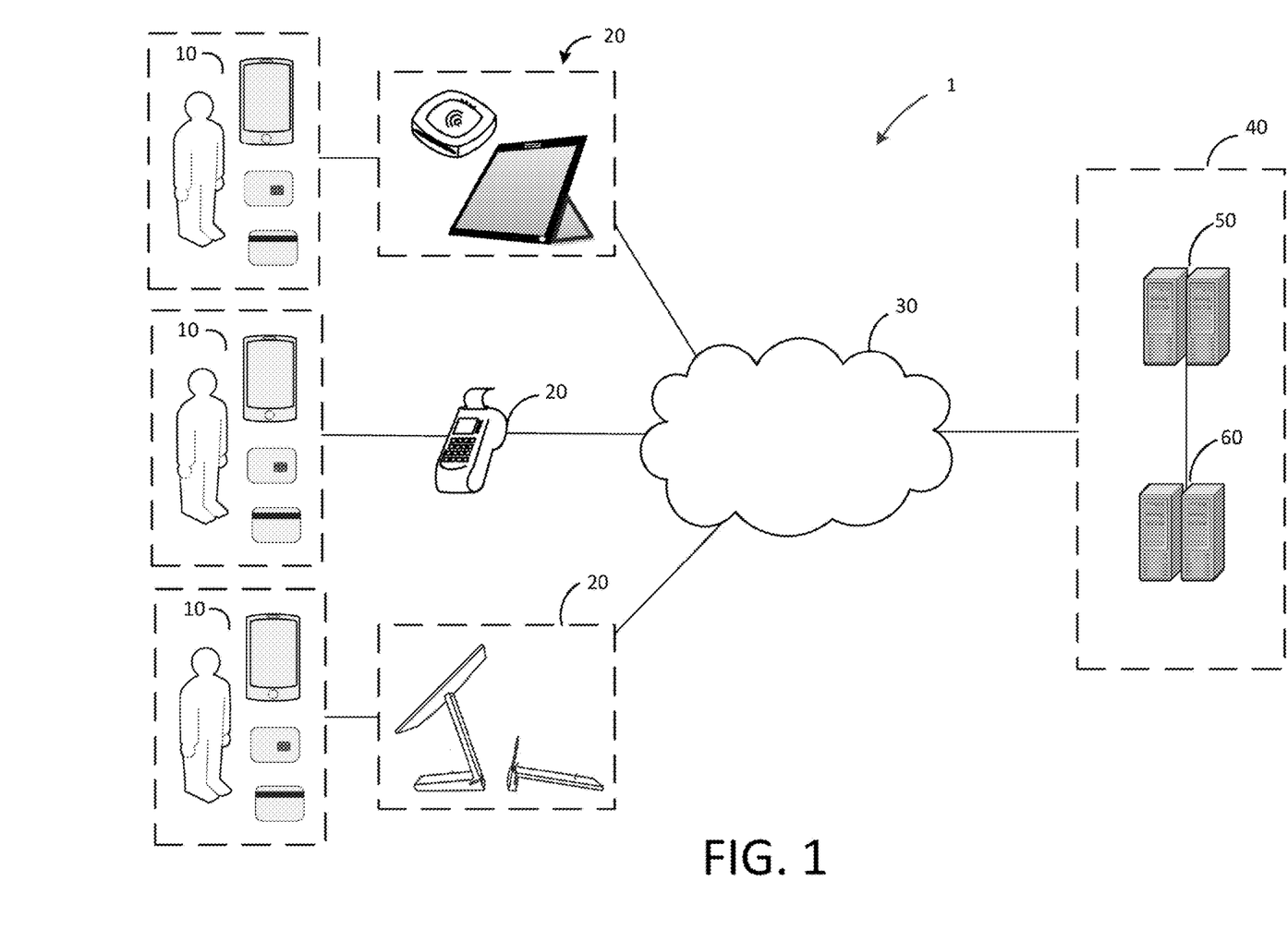
FIG. 1 shows an illustrative block diagram of a payment system in accordance with some embodiments of the present disclosure.

FIG. 1 depicts an illustrative block diagram of a payment system 1 that utilizes NFC communication in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10, such as a credit card having magnetic stripe, a credit card having an externally-driven processing device such as an EMV chip, or a NFC-enabled electronic device such as a smart phone running a payment application. The merchant has a payment terminal 20 such as a merchant device, payment reader, standalone terminal, combined customer/merchant terminals, electronic device (e.g., smart phone) running a point-of-sale application, or other electronic device that is capable of processing payment information (e.g., encrypted payment card data and user authentication data) and transaction information (e.g., purchase amount and point-of-purchase information).

In some embodiments (e.g., for low-value transactions or for payment transactions that are less than a payment limit indicated by an NFC or EMV payment device 10), the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a display device of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

During transactions involving an EMV card, the EMV card may be inserted into a card slot of the payment terminal. The terminal may make a number of electrical connections with the EMV card including, inter alia, a power line, a ground line, a clock source line and a data line. The EMV card may have at least one processor that is powered by the power and ground lines, and that performs various functions in conjunction with the payment terminal, such as encryption and communication of card and transaction information, for example via an authorization request cryptogram (ARQC) and other transaction information.

Figure 2:
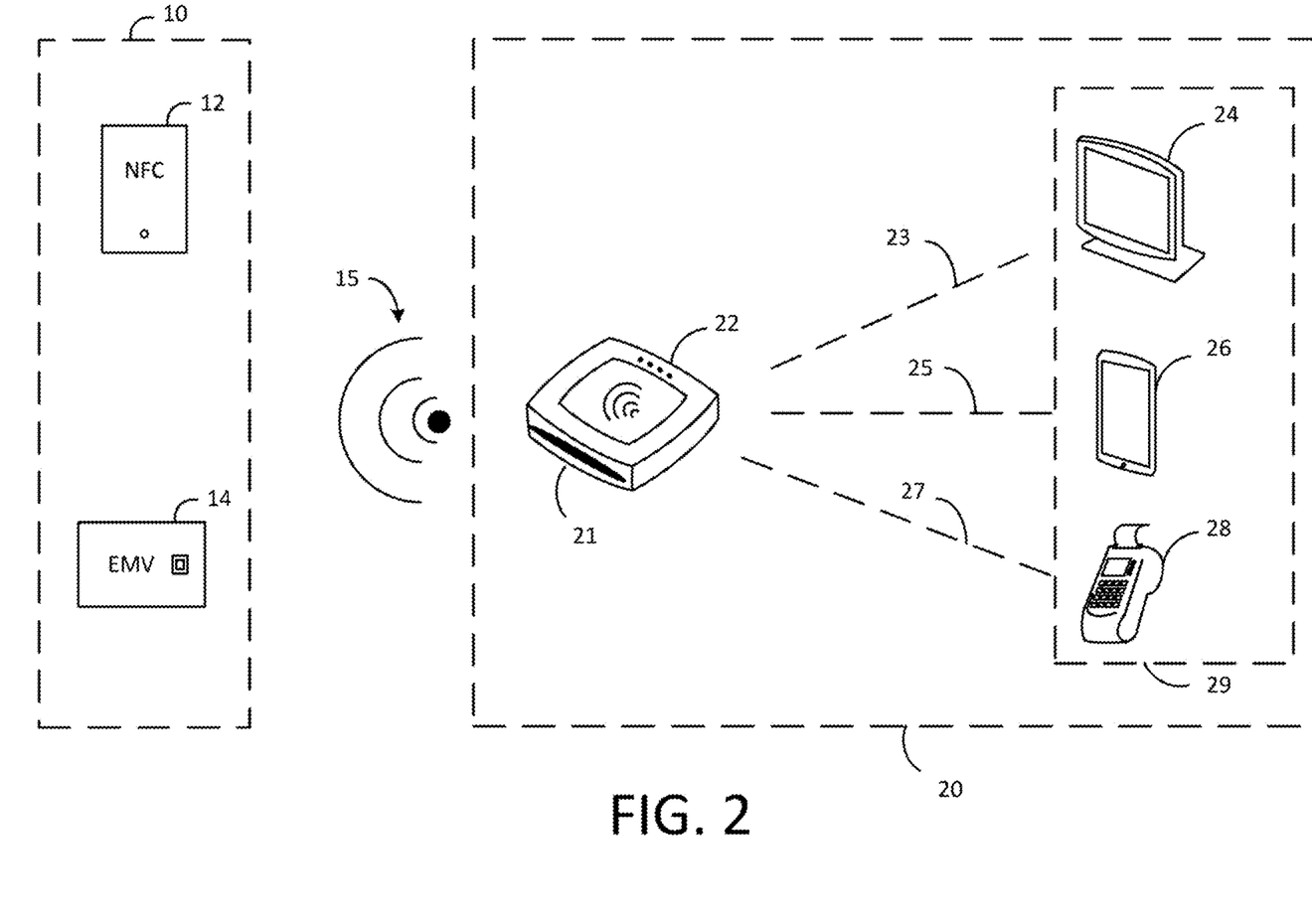
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29 (either or which may be an NFC device as will be described in more detail below). However, it will be understood that as used herein, the term payment terminal may refer to any suitable component of the payment terminal, such as payment reader 22. In an embodiment, the payment reader 22 of payment terminal 20 may be a device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14 (which also may be an NFC device capable of communicating with the payment reader 22 via NFC). Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. In some embodiments, chip card 14 may include an EMV chip that is an externally-driven processing device that receives signals necessary to operate the EMV chip (e.g., power, ground, and clock signals) from an external source. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on at least one processor in accordance with a host card emulation routine) for performing secure transaction functions. During a payment transaction, NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power and a clock signal to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the Internet and payment and transaction information may be communicated between payment terminal 20 and payment server 40 in an encrypted format such by a transport layer security (TLS) or secure sockets layer (SSL) protocol.

Figure 3:
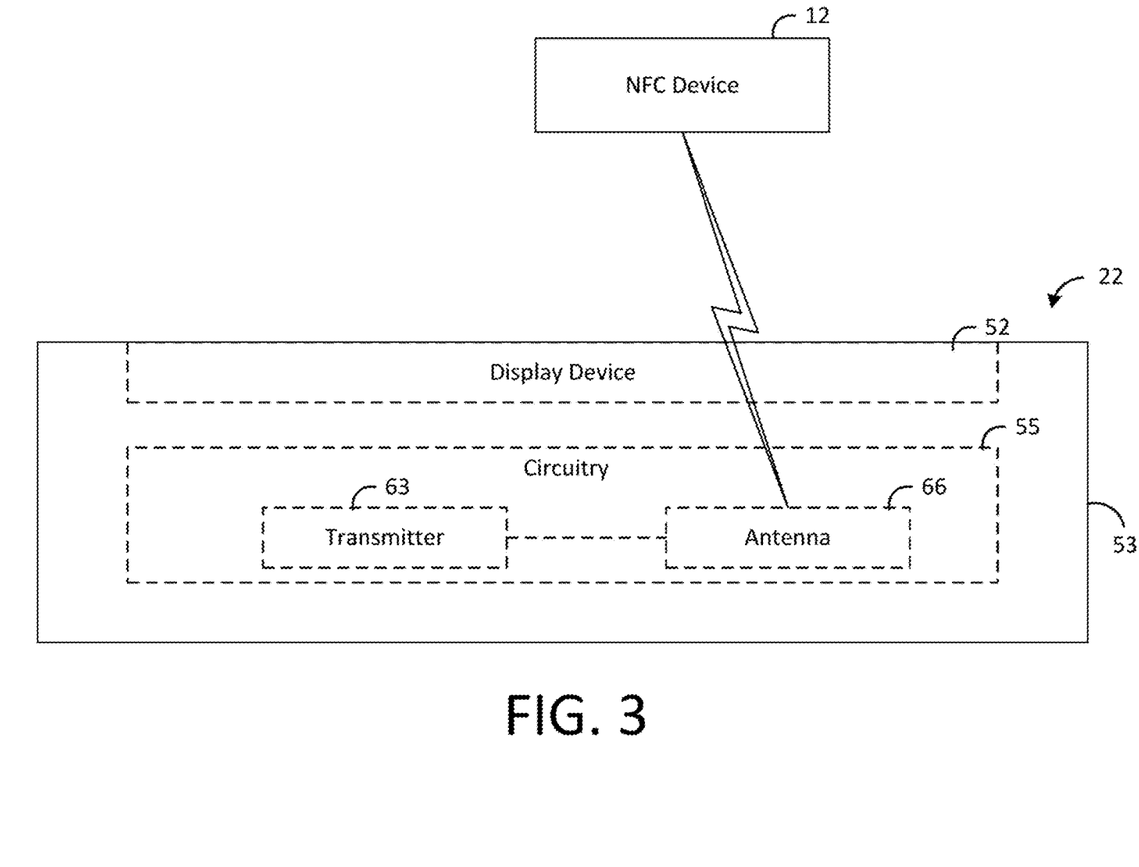
FIG. 3 depicts an illustrative payment reader in accordance with some embodiments of the present disclosure.

FIG. 3 depicts an exemplary payment reader 22 having a display device 52, such as liquid crystal display, attached to a housing 53. Located within the housing 53 is circuitry 55 for performing various functions, including the processing of payment transactions, as described above. The circuitry 55 may include one or more processors, field-programmable gate arrays (FPGAs), or other types of circuitry for performing the functions of the reader 22. As shown by FIG. 3, the circuitry 55 includes a transmitter 63 coupled to an antenna 66 for transmitting wireless NFC signals from the reader 22. As an example, when the reader 22 is sufficiently close to an NFC device 12 such that the antenna 66 is inductively coupled to an antenna of the NFC device 12, the transmitter 63 may transmit to the NFC device 12 a wireless carrier signal that is load modulated by the NFC device 12 in order to transmit payment information for use in processing a payment transaction.

Figure 4:
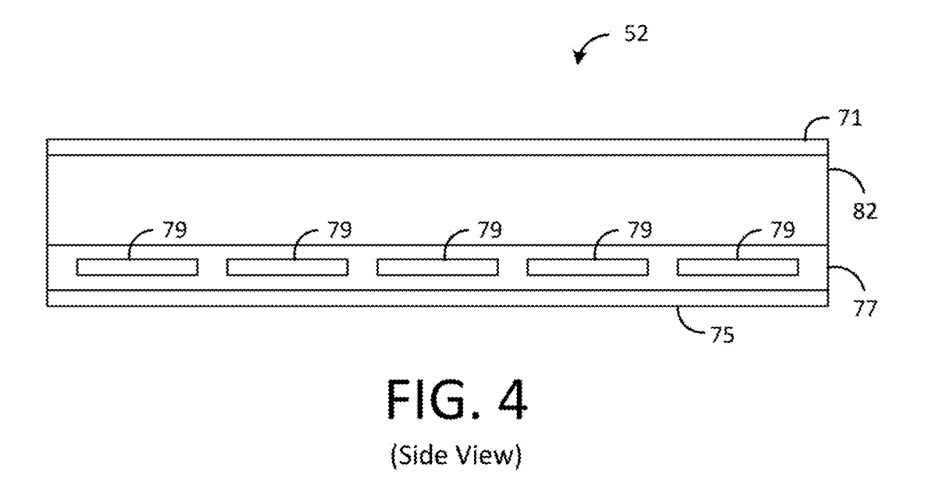
FIG. 4 depicts an illustrative display device in accordance with some embodiments of the present disclosure.

In the example shown by FIG. 3, the display device 52 is between the NFC device 12 and the antenna 66, and the wireless signal transmitted from the antenna 66 to the NFC device 12 passes through and is attenuated by the display device 52. FIG. 4 depicts an exemplary embodiment of the display device 52. For illustrative purposes, FIG. 4 depicts a display device 52 that is implemented as an LCD, but other types of display devices are possible in other embodiments.

As shown by FIG. 4, the display device 52 has a top panel 71 that forms a display screen on which information displayed by the device 52 may be viewed by a user. In some embodiments, the top panel 71 may form a touch-sensitive display screen that may be used to receive touch inputs from a user in addition to displaying information (e.g., a personal identification number (PIN) pad) to the user. The opposite end of the display device 52 has a reflector 75 that reflects light through the device 52 such that the light is emitted through the top panel 71 forming an image on the top panel 71. In this regard, a light emitting diode (LED) housing 77 that houses at least one LED 79 is positioned between the reflector 79 and the panel 71. Each LED 79 emits light, and at least some of the light is incident on and reflects from the reflector 75 toward the top panel 71. As shown by FIG. 4, this light travels through various LCD layers 82, which are not shown in detail for simplicity of illustration, before reaching the panel 71. At least one of the layers 82 includes liquid crystal, which can be modified by electrical current in order to change the optical properties of the liquid crystal and hence the image that is formed on the panel 71 by the light. In other embodiments, other types of display devices and light sources may be used as may be desired.

Figure 5:
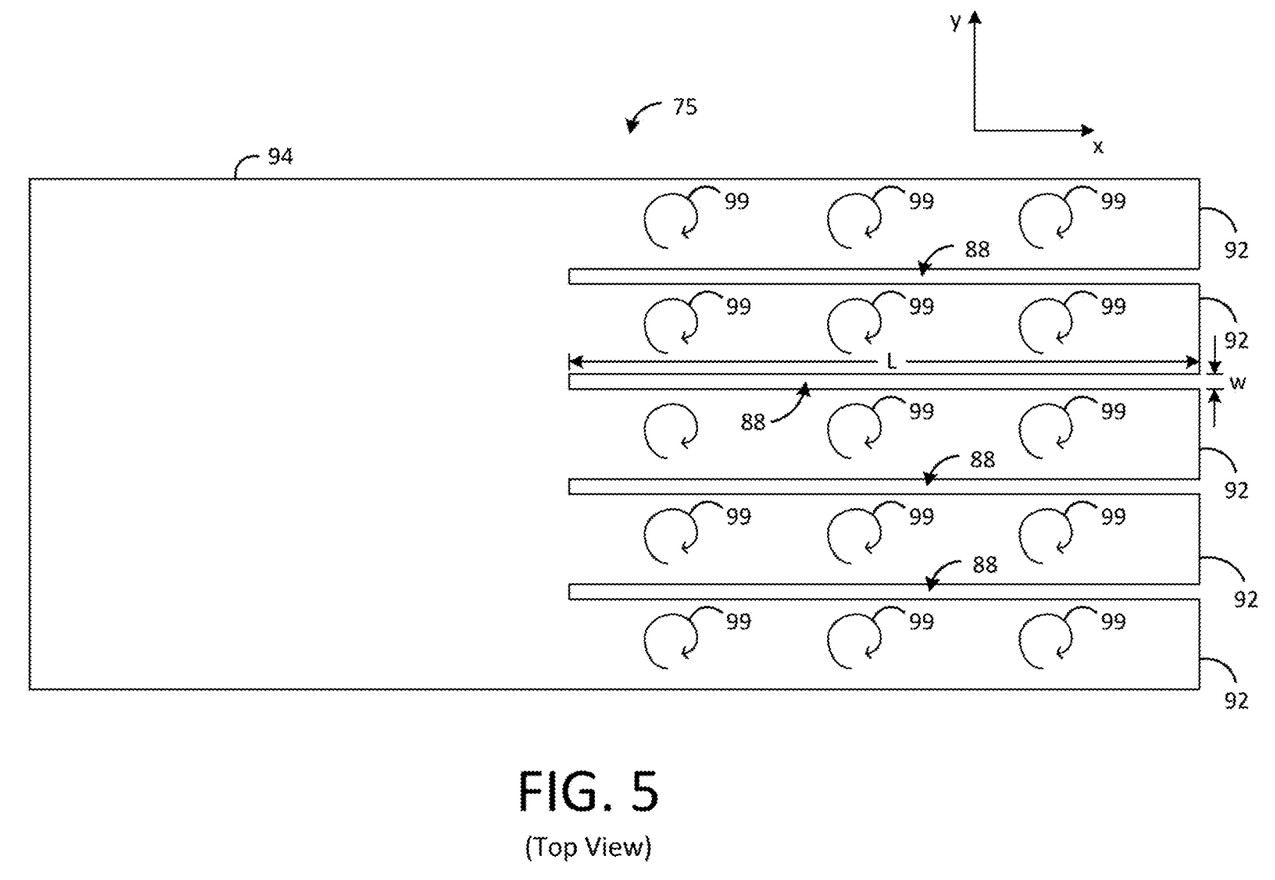
FIG. 5 depicts a top view of an illustrative reflector in accordance with some embodiments of the present disclosure.
Figure 6:
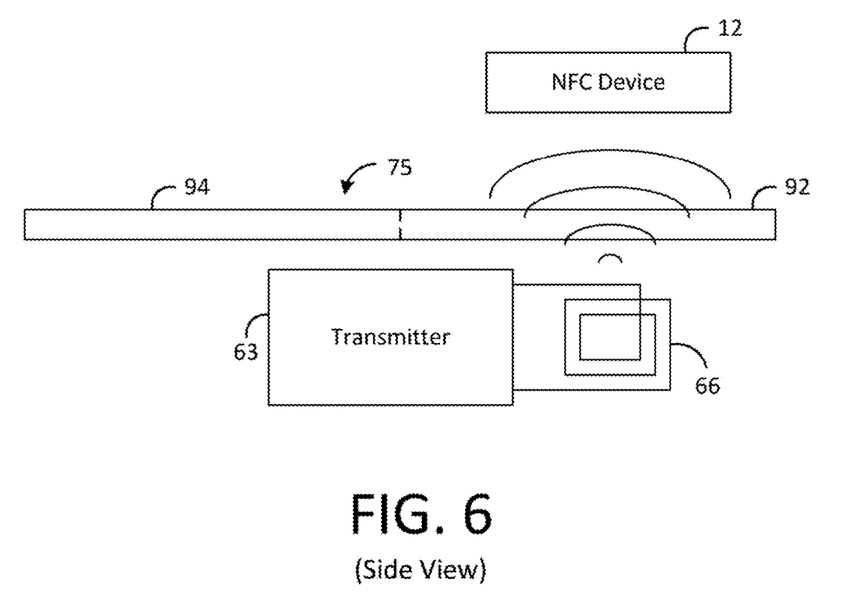
FIG. 6 depicts a side view of the reflector depicted in FIG. 5.

FIGS. 5 and 6 show a top view and a side view, respectively, of the reflector 75. As best illustrated by FIG. 5, the reflector 75 is shown to be a rectangular structure having plurality of narrow gaps 88 (e.g., slits) cut or otherwise formed in the reflector 75, thereby forming a plurality of fingers 92 that are separated by the gaps 88. The gaps 88 may be filled with air or an insulating material, such as plastic. For simplicity of illustration, FIG. 5 shows five fingers 92 but the reflector 75 may have any number of fingers 92 in other embodiments.

The fingers 92 extend from a main body 94 that is free of gaps, though it is possible for the main body 94 to have one or more gaps in other embodiments. In one embodiment, the reflector 75 is composed of electrically and thermally conductive material, such as aluminum or other metal, and the reflector 75 is positioned such that the fingers 92 are above the antenna 66, as shown by FIG. 6. Specifically, the reflector 75 is positioned relative to the antenna 66 such that the wireless signal transmitted from the antenna 66 to the NFC device 12 passes through the fingers 92. Indeed, during use, the fingers 92 may be positioned directly between the antenna 66 of the payment reader 22 and the antenna of the NFC device 12.

Electromagnetic energy from the wireless signal transmitted through the fingers 92 induces the flow of eddy currents 99 in the fingers 92. The reflector 75 is patterned by the gaps 88 such that the loop sizes of the eddy currents in the fingers 92 are reduced relative to an embodiment in which the gaps 88 are not present. By reducing the loop sizes of the eddy currents, the reflector 75 consumes less power from the transmitted signal.

In the embodiment shown by FIG. 5, the fingers 92 extend in the x-direction. That is, the longitudinal axis of each finger 92 is parallel to the x-direction, and each finger 92 is separated from its adjacent finger 92 by a width (w) in the y-direction, which is perpendicular to the x-direction.

In general, it is desirable for the sizes of the gaps 88 to be as small as possible in order to reduce the effect of the gaps 88 on the optical efficiency and heat sinking capacity of the display device 52. However, smaller gap size may increase capacitance between the fingers 92. If the capacitance becomes high, then it may be possible for eddy current in one finger 92 to flow across the gap 88 to its adjacent finger 92, thereby increasing the loop size of the eddy current. Thus, it is generally desirable for the width of the gaps 88 in the y-direction to be as small as possible but sufficiently large such that the eddy currents are prevented from flowing across the gaps 88 from one finger 92 to another.

Capacitance between the fingers 92 and hence the desired minimum gap size between the fingers 92 are based on the frequency of the transmitted signal. In this regard, the capacitance (C) between a pair of adjacent fingers 92 separated by a gap 88 may be expressed by the following equation:

$$C = k(H \cdot L)/w \qquad (1)$$

where k is a constant (the permittivity of the air or other material in the gap 88), H is the thickness of the fingers 92, L is the length of the gap 88 in the x-direction, and w is the width of the gap 88 in the y-direction.

The impedance ($X_C$) of the gap 88 along the finger length (L) can be expressed according to the following equation:

$$X_C = 1/(2\pi f C) \qquad (2)$$

where f is the frequency of the wireless signal transmitted by the antenna 66. Using Equations (1) and (2) above, a width (w) for each gap 88 can be selected such that the impedance $X_C$ is sufficiently high to prevent current flow across the gap 88. As an example, an impedance of about 1000 Ohms or more should be sufficient to prevent such current flow and thus limit the loop size of eddy currents in the fingers 92. In general, higher frequencies require greater minimum gap sizes. In one exemplary embodiment for which the reflector 75 is composed of aluminum and the frequency of the wireless signal is 13.56 MHz, the width of each gap 88 in the y-direction is about 0.5 millimeters (mm), the width of each finger in the y-direction is about 5 mm, and the length of each finger 92 in the x-direction is about 12 centimeters (cm). In other embodiments, other dimensions are possible.

As noted above, the main body 94 of the reflector 75 in FIG. 5 is solid having no gaps, thereby helping the main body 94 to better disperse heat and reflect light. In the embodiment shown by FIG. 5, each of the fingers 92 extends from the main body 94, which provides a thermally conductive path for heat from each of the fingers 92. Thus, heat may flow from each of the fingers 92 to the main body 94, which then disperses and dissipates the heat across a large, continuous surface area relative to the fingers 92.

In addition, the antenna 66 may be positioned directly beneath the fingers 92 so that a substantial portion of the electromagnetic energy of the wireless signal to be received by the NFC device 12 passes through the fingers 92 instead of the main body 94. In this regard, the lengths (L) of the gaps 88 may be sufficiently long so that the finger portion of the reflector 75 is directly between the antenna 66 and the NFC device 12 for a range of expected locations of the NFC device 12 during operation. In such an embodiment, the design of the finger portion of the reflector 75 (through which a substantial portion of the wireless signal passes) is optimized for limiting parasitic power consumption, and the design of the main body 94 is optimized for heat sinking and optical efficiency. Notably, heat in the fingers 92 may flow to the main body 94, which disperses the heat across the relatively large, continuous surface area of the main body 94.

In the embodiment shown by FIG. 5, the reflector 75 is shown as a rectangular structure having rectangular fingers 92 separated by straight gaps 88. In other embodiments, other shapes of the reflector 75, fingers 92, and gaps 88 are possible. Indeed, there are many patterns of gaps that can be employed in order to limit the eddy current loop sizes in the portion of the reflector 75 between the antenna 66 and the expected locations of the NFC device 12. The pattern shown by FIG. 3, which results in relatively long, straight gaps 88 and fingers 92, helps to improve the heat sinking characteristics of the reflector 75 by allowing efficient flow of heat in the fingers 92 to the main body 94. However, it should be emphasized that other gap patterns and shapes are possible.

Figure 7:
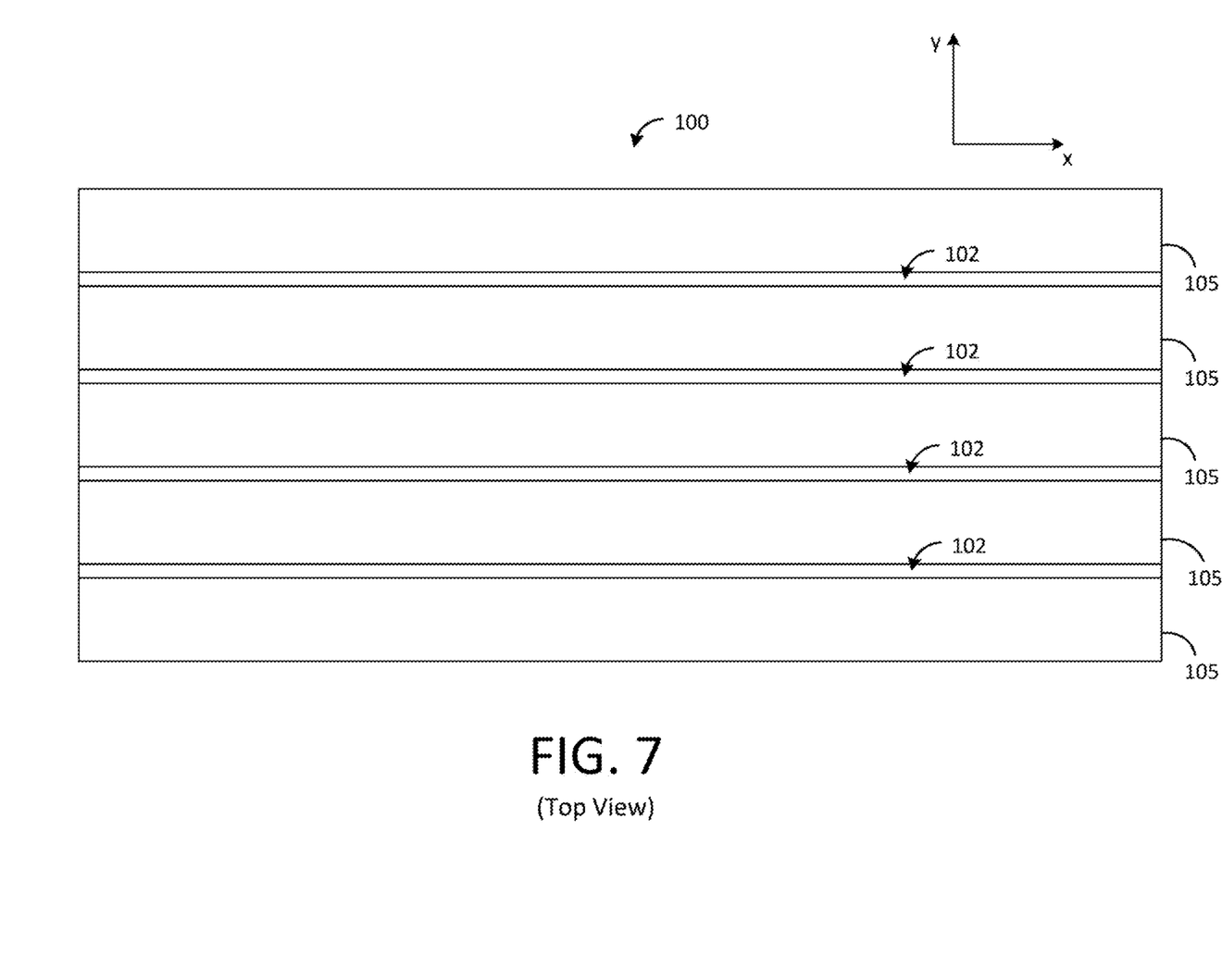
FIG. 7 depicts a top view of an illustrative reflector in accordance with some embodiments of the present disclosure.

As an example, FIG. 7 shows another embodiment of a reflector 100 that may be used in place of the reflector 75 described above with reference to FIGS. 4 and 5. The reflector 100 of FIG. 7 is similar to the reflector 75 of FIG. 5 except that gaps 102 extend from one end of the reflector 100 to the opposite end of the reflector 100 as shown. Thus, the reflector 100 comprises a plurality of fingers 105 that are electrically isolated from each other. In this regard, as described above for the reflector 75 of FIG. 5, the gaps 102 may be sized to be as small as possible in order to enhance the heat sinking capacity and optical efficiency of the display device but sufficiently large in order to prevent current from flowing from one finger 105 to another. Thus, the gaps 102, like the gaps 88 for the embodiment depicted by FIG. 5, limit the loop sizes of the eddy currents flowing in the fingers 105.

In order to facilitate handling and mounting of the reflector 100, the gaps 102 may be filled with an electrically insulating material, such as plastic, that joins each finger 105 to its adjacent finger 105. Thus, even though the gaps 102 extend all of the way across the reflector 100 from one end to another, the use of insulating material in the gaps 102 permits the reflector 100 to form a unitary structure that facilitates handling and positioning of the reflector 100 during manufacturing.

Figure 8:
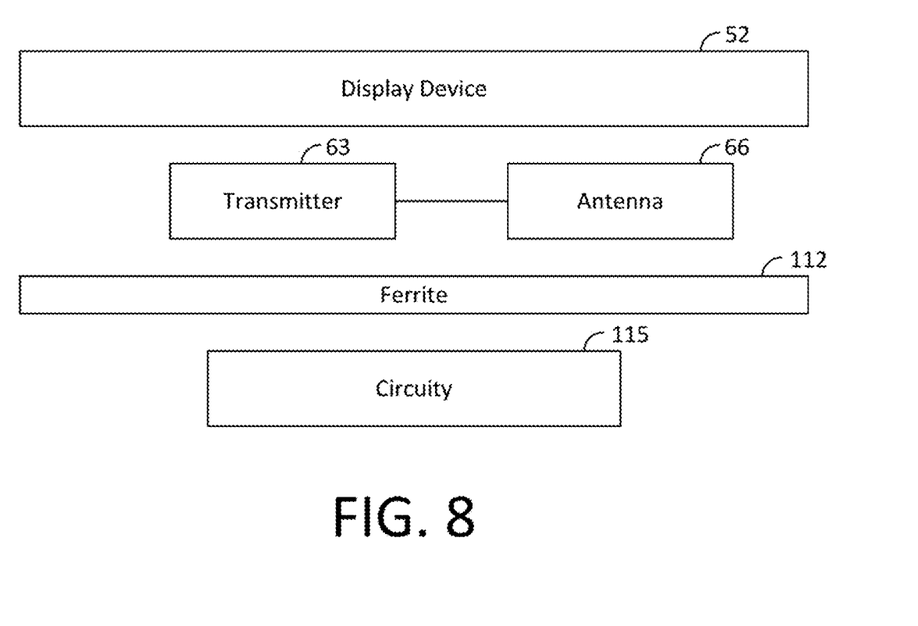
FIG. 8 shows an illustrative block diagram of a payment reader in accordance with some embodiments of the present disclosure.
Figure 9:
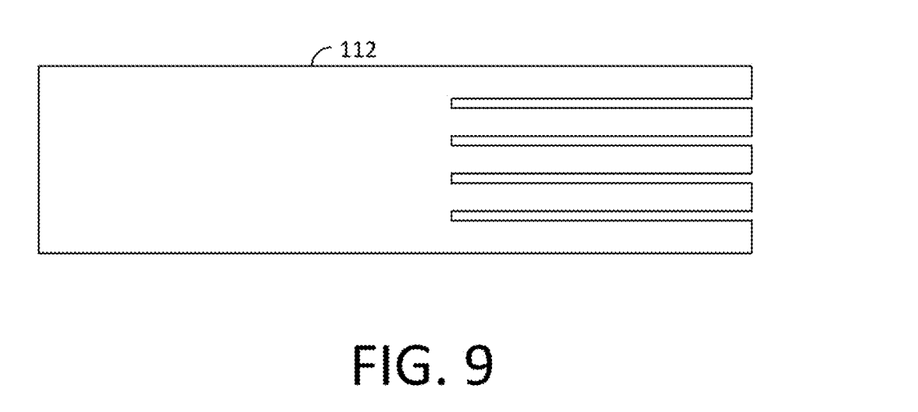
FIG. 9 depicts a top view of a ferrite layer depicted in FIG. 8.

In some embodiments, as shown by FIG. 8, a ferrite layer 112 may be positioned between the antenna 66 and other circuitry 115 of the payment reader 22 in order to shield the circuitry from the electromagnetic energy emitted by the antenna 66. The ferrite layer 112 may have a parasitic effect on the wireless signal transmitted by the antenna and attenuate the signal, similar to the reflector 75. In one embodiment, the ferrite layer 112 is patterned, as described above for the reflector 75. FIG. 9 shows a pattern similar to the one described above for the reflector 75, but other types of patterns are possible in other embodiments. As an example, a ferrite similar in shape to the reflector 100 depicted by FIG. 7 may be used. Patterning the ferrite layer 112 with one or more gaps may help to reduce the parasitic effects of the ferrite layer 112 on the wireless signal transmitted by the antenna similar to the reflector 75 described above.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A payment reader, comprising:
   an antenna;
   circuitry coupled to the antenna, the circuitry configured to transmit a near field communication (NFC) signal to an NFC device and to receive data transmitted to the payment reader by the NFC device via load modulation of the NFC signal, the circuitry further configured to process a payment transaction based on the data; and
   a liquid crystal display (LCD) having (1) a display screen for displaying information, (2) at least one light source, and (3) a conductive reflector for reflecting light from the at least one light source through the display screen,
   wherein the antenna is positioned such that the NFC signal transmitted from the antenna to the NFC device passes through a first portion of the conductive reflector, thereby inducing eddy current to flow in the first portion,
   wherein the first portion of the conductive reflector has at least one gap forming a plurality of fingers, including at least a first finger and a second finger separated by the at least one gap, and
   wherein a width of the at least one gap between the first finger and the second finger is sufficiently large to prevent the eddy current from flowing between the first finger and the second finger across the at least one gap, thereby reducing loop sizes of the eddy current in the first finger and the second finger such that parasitic power consumption by the reflector is reduced and a transparency of the LCD to the NFC signal is improved.

2. The payment reader of claim 1, wherein each of the plurality of fingers extends from a second portion of the reflector that forms a thermally conductive path for dispersing heat from each of the plurality of fingers.

3. A wireless communication device, comprising:
   an antenna;
   circuitry having a transmitter coupled to the antenna, the transmitter configured to transmit a wireless signal from the antenna; and
   a display device for displaying information, the display device having at least one light source and a conductive reflector for reflecting light from the light source, wherein the antenna is positioned such that the wireless signal passes through a first portion of the conductive reflector, thereby inducing eddy current to flow in the first portion, and wherein the first portion of the conductive reflector has at least one gap for reducing loop sizes of the eddy current, thereby improving a transparency of the display device to the wireless signal.

4. The wireless communication device of claim 3, wherein the wireless communication device is a near field communication (NFC) device, and wherein the wireless signal is an NFC signal.

5. The wireless communication device of claim 3, wherein the wireless communication device is a payment reader, and wherein the circuitry is configured to process a payment transaction based on the data.

6. The wireless communication device of claim 3, wherein the at least one gap is filled with air.

7. The wireless communication device of claim 3, wherein the at least one gap is filled with an electrically insulating material.

8. The wireless communication device of claim 3, wherein the at least one gap forms a plurality of fingers in the first portion extending from a second portion of the conductive reflector, the plurality of fingers including at least a first finger and a second finger, wherein the at least one gap includes a first gap that separates the first finger from the second finger, and wherein a width of the first gap is sufficiently large to prevent the eddy current from flowing between the first finger and the second finger across the first gap.

9. The wireless communication device of claim 8, wherein the second portion forms a thermally conductive path for dispersing heat from the first finger and the second finger.

10. The wireless communication device of claim 9, wherein the plurality of fingers include a third finger, wherein the at least one gap includes a second gap that separates the third finger from the second finger, wherein a width of the second gap is sufficiently large to prevent the eddy current from flowing between the second finger and the third finger across the second gap, and wherein the thermally conductive path disperses heat from the third finger.

11. A wireless communication method, comprising:
displaying an image with a display screen of a display device attached to a first wireless communication device, the displaying comprising reflecting light from a light source with a conductive reflector through the display screen;
transmitting a wireless signal from a first wireless communication device to a second wireless communication device, wherein the transmitted signal passes through a first portion of the conductive reflector; and
inducing eddy current to flow in the first portion with the transmitted wireless signal, wherein the conductive reflector has at least one gap with a width that is sufficiently large to prevent the eddy current from flowing across the at least one gap, thereby reducing loop sizes of the eddy current and improving a transparency of the display device to the wireless signal.

12. The method of claim 11, wherein the wireless communication device is a near field communication (NFC) device, and wherein the wireless signal is an NFC signal.

13. The method of claim 11, wherein the first wireless communication device is a payment reader, and wherein the method further comprises processing a payment transaction with the payment reader based on the wireless signal.

14. The method of claim 11, wherein the at least one gap forms a plurality of fingers in the first portion extending from a second portion of the conductive reflector, the plurality of fingers including at least a first finger and a second finger, wherein the at least one gap includes a first gap that separates the first finger from the second finger, and wherein a width of the first gap is sufficiently large to prevent the eddy current from flowing between the first finger and the second finger across the first gap.

15. The method of claim 14, further comprising dispersing heat from the first finger and heat from the second finger with the second portion.

16. The method of claim 15, wherein the plurality of fingers include a third finger, wherein the at least one gap includes a second gap that separates the second finger from the third finger, wherein a width of the second gap is sufficiently large to prevent the eddy current from flowing between the second finger and the third finger across the second gap, and wherein the dispersing comprises dispersing heat from the third finger with the second portion.

* * * * *